United States Patent [19]
Takenaka et al.

[11] Patent Number: 5,898,724
[45] Date of Patent: Apr. 27, 1999

[54] GAS LASER APPARATUS

[75] Inventors: Yoshiaki Takenaka, Osaka; Shigeki Yamane, Kobe, both of Japan

[73] Assignee: Matsushita Electric Industrial Co., Ltd., Osaka, Japan

[21] Appl. No.: 08/784,310

[22] Filed: Jan. 16, 1997

[30] Foreign Application Priority Data

Jan. 19, 1996 [JP] Japan ................................. 8-025806

[51] Int. Cl.⁶ ........................................................ H01S 3/03
[52] U.S. Cl. .............................. 372/61; 372/58; 372/701
[58] Field of Search ................................ 372/58, 61, 701

[56] References Cited

U.S. PATENT DOCUMENTS 5,422,906  6/1995  Karasaki et al. ........................... 372/61
5,450,435  9/1995  Yamane et al. ............................ 372/61

*Primary Examiner*—Rodney Bovernick
*Assistant Examiner*—Robert E. Wise
*Attorney, Agent, or Firm*—Stevens, Davis, Miller & Mosher, L.L.P.

[57] ABSTRACT

A gas laser apparatus for generating a laser beam along a light beam axis, comprises, a gas as a laser medium, a dielectric tube through which the gas passes, and which surrounds the light beam axis, a pumping source generating an electric discharge through the gas existing in the dielectric tube to excite the gas so that a laser light is generated from the excited gas, and a gas blower blowing the gas into the dielectric tube, wherein the gas blower forms a circumferential flow direction component of the gas in the dielectric tube.

9 Claims, 9 Drawing Sheets

GAS LASER APPARATUS

BACKGROUND OF THE INVENTION AND RELATED ART STATEMENT

The present invention relates to a gas laser apparatus, in which a longitudinal axis of a dielectric tube in which a laser medium gas is excited by electric discharge to generate a laser beam is substantially identical to an axis of the generated laser beam, and/or a microwave is used to excite the laser medium gas.

In a conventional gas laser apparatus, the laser medium gas flows into the dielectric tube from a passage whose central axis crosses perpendicularly the longitudinal axis of the dielectric tube, and a plurality of microwaves with respective induction electric-field directions different from each other are used to generate the electric discharge.

OBJECT AND SUMMARY OF THE INVENTION

An object of the present invention is to provide a gas laser apparatus, in which the electric discharge for exciting the laser medium gas to generate the laser beam is stabilized to increase an output of the laser beam.

According to the present invention, a gas laser apparatus for generating a laser beam along a light beam axis, comprises a gas as a laser medium, a dielectric tube through which the gas passes, and which surrounds the light beam axis, a pumping source generating an electric discharge through the gas existing in the dielectric tube to excite the gas so that a laser light is generated from the excited gas, and a gas blower blowing the gas into the dielectric tube, wherein the gas blower forms a circumferential flow direction component of the gas in the dielectric tube.

Since the gas blower forms the circumferential flow direction component of the gas in the dielectric tube, the gas in the dielectric tube is refreshed and/or churned efficiently so that the electric discharge through the laser medium gas is stabilized.

If the gas blower has a nozzle to increase a velocity of the gas blown into the dielectric tube, the gas in the dielectric tube is refreshed and/or churned more efficiently. If the gas blower has at least one passage from which the gas is blown into the dielectric tube, and the passage extends obliquely relative to both the light beam axis and an imaginary plane perpendicular to the light beam axis or relative to both the imaginary plane perpendicular to the light beam axis and another imaginary plane including the light beam axis, the circumferential flow component of the gas in the dielectric tube is correctly formed while an axial or longitudinal flow component of the gas in the dielectric tube is correctly formed, or the gas is correctly urged toward a circumferential direction of the dielectric tube while the gas is correctly urged toward an axial or longitudinal direction of dielectric tube before flowing into the dielectric tube. If the gas blower has at least one passage from which the gas is blown into the dielectric tube, the passage extends along a passage axis (passage or flow central axis), and the passage axis is prevented from joining with or crossing the light beam axis or is separated away from the light beam axis in a radial direction of the dielectric tube, the circumferential flow component of the gas in the dielectric tube is correctly formed or the gas is correctly urged toward a circumferential direction of the dielectric tube before flowing into the dielectric tube. The passage may extend helically.

If the gas blower has a plurality of passages from which the gas is blown into the dielectric tube, and the passages extend substantially parallel to each other so that a flow interference between portions of the gas blown respectively from the passages is restrained, the circumferential flow-direction-component or helical flow of the gas in the dielectric tube from each of the passages is maintained stably to efficiently refresh and/or churn the gas in the dielectric tube so that the electric discharge through the laser medium gas is stabilized.

If the plurality of passages extend along respective passage axes, and the passage axes are prevented from joining with or crossing each other to restrain the flow interference between the portions of the gas blown respectively from the passages, the electric discharge through the laser medium gas is also stabilized.

The gas blower may form a helical flow of the gas proceeding with rotating or orbiting around the light beam axis in the dielectric tube so that the electric discharge through the laser medium gas is kept constant in the circumferential and/or axial direction of the dielectric tube by the helical gas flow to stabilize and increase an output of the laser beam. If a cross sectional gas-flow area of the passage decreases or the passage is tapered, toward the dielectric tube (electric discharge chamber) in a gas flow direction, the gas in the dielectric tube is refreshed and/or churned more efficiently by an increased velocity of the gas blown from the passage and/or by the generated helical gas flow around the light beam axis. The tapered passage including a tapered arrangement of the passages may be substantially symmetrical relative to the laser beam axis.

If the gas blower has an at least partially helical passage from which the gas is blown into the dielectric tube, and the whole of the gas to be blown into the dielectric tube passes the at least partially helical passage so that at least a portion of the gas is prevented from being directly blown into the dielectric tube without passing the at least partially helical passage, the gas in the dielectric tube is refreshed and/or churned more efficiently.

DETAILED DESCRIPTION OF PREFERRED EMBODIMENTS

Figure 1:
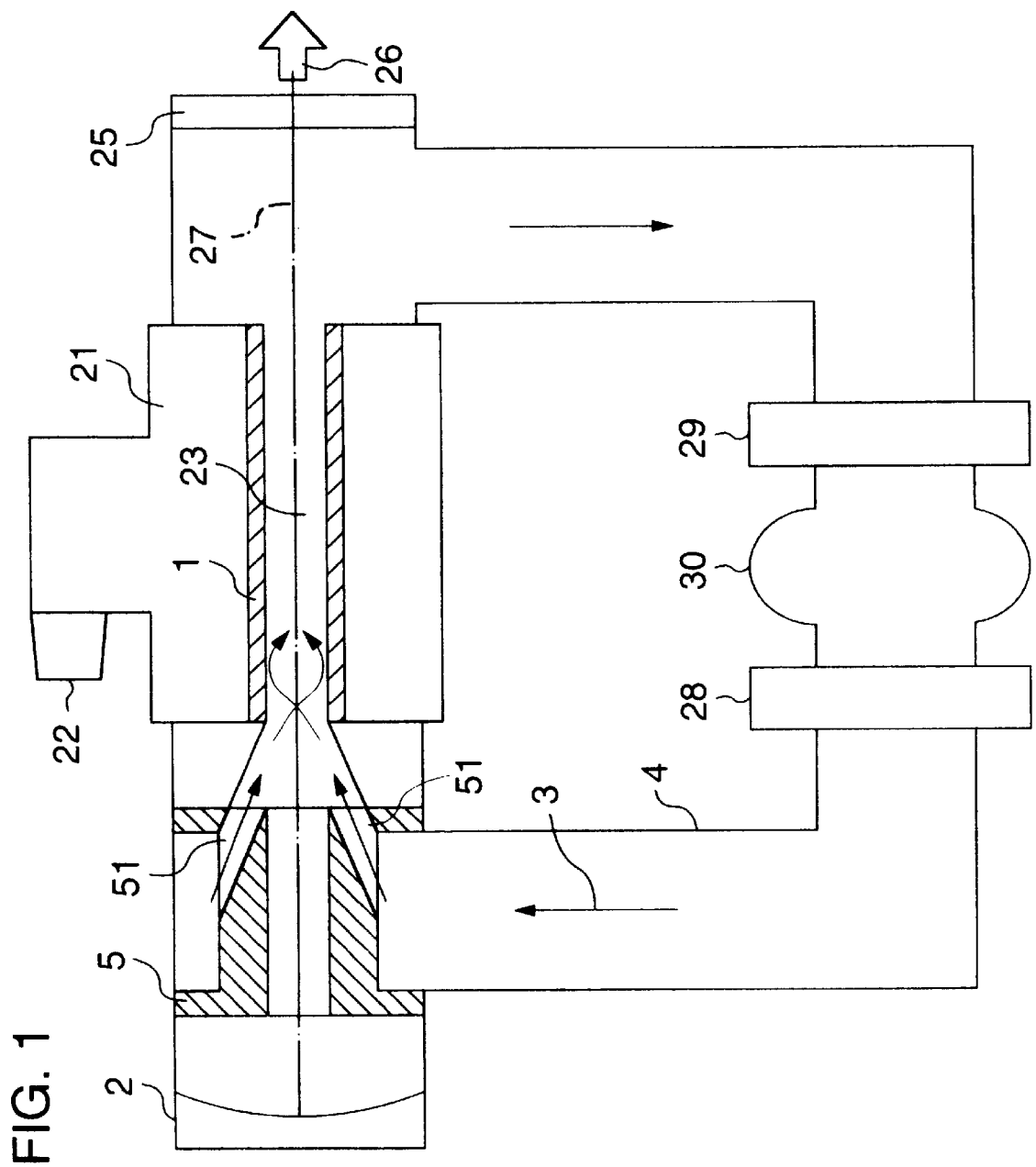
FIG. 1 is a schematic view of a laser apparatus as an embodiment of the present invention.

As shown in FIG. 1, a laser apparatus of the present invention comprises, a gas as a laser medium, a dielectric tube or electric discharge chamber tube (made of, for example, glass) 1 in whose electric discharge chamber 23 therein the gas passes and which surrounds a light beam axis 27 of a generated laser beam 26, a laser light optical resonance mirror pair of high reflector 2 and output coupler or translucent reflector 25 arranged at opposite sides of the dielectric tube in a laser beam axial direction, a pumping source or microwave resonance cavity element 21 receiving the electric discharge chamber tube 1 to generate an electric discharge through the gas existing in the dielectric tube to excite the gas so that a laser light is generated from the excited gas, a microwave generator or magnetron 22, a gas blower 5 blowing the gas into the dielectric tube, a motor 30 generating a gas flow 3 blown into the dielectric tube 1 through a transfer pipe 4 and the gas blower 5, and heat exchangers 28 and 29 cooling the gas heated in the electric discharge chamber 23.

Figure 2A:
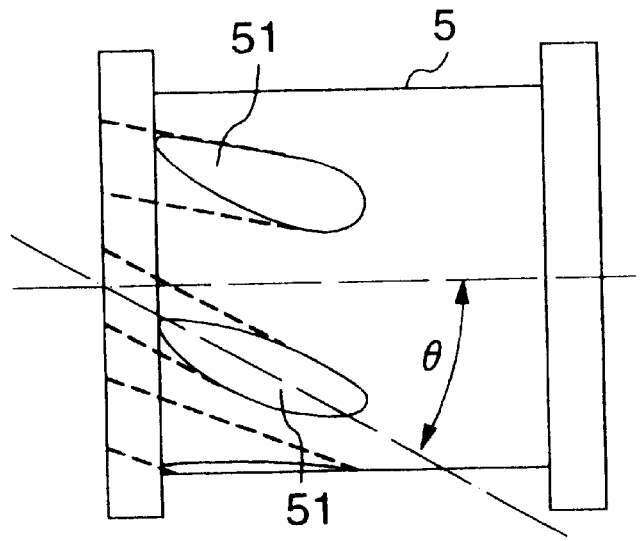
FIG. 2A is a side view of a gas blower including hole-passages of the present invention.
Figure 2B:
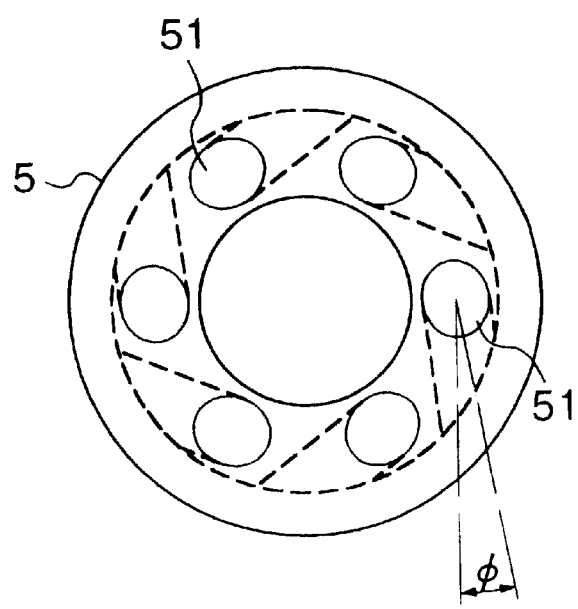
FIG. 2B is a front view of the gas blower of FIG. 2A.

As shown in FIGS. 2A and 2B, the gas blower 5 has hole-passages 51 extending obliquely relative to both the light beam axis 27 and an imaginary plane perpendicular to the light beam axis 27 or relative to both the imaginary plane perpendicular to the light beam axis 27 and another imaginary plane including the light beam axis 27 to form a circumferential flow component or helical flow of the gas into the electric discharge chamber 23. If the hole-passages 51 are tapered toward the electric discharge chamber 23 to decrease a cross sectional area of the hole-passages 51 toward the electric discharge chamber 23, the gas flow blown into the electric discharge chamber 23 is accelerated. Each of angles θ and ψ may be changed to adjust the helical gas flow.

Figure 3:
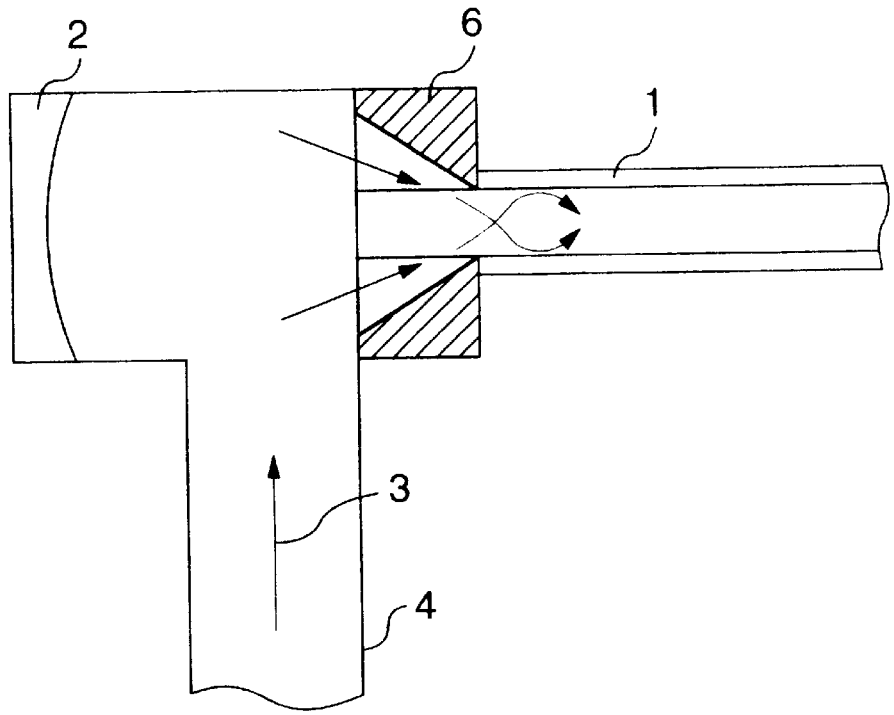
FIG. 3 is a cross-sectional side view of a gas blower including vanes and passages therebetween of the present invention.
Figure 4A:
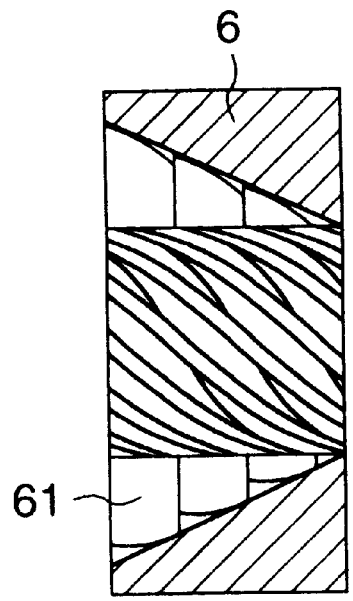
FIG. 4A is a cross sectional side view of the gas blower of FIG. 3.
Figure 4B:
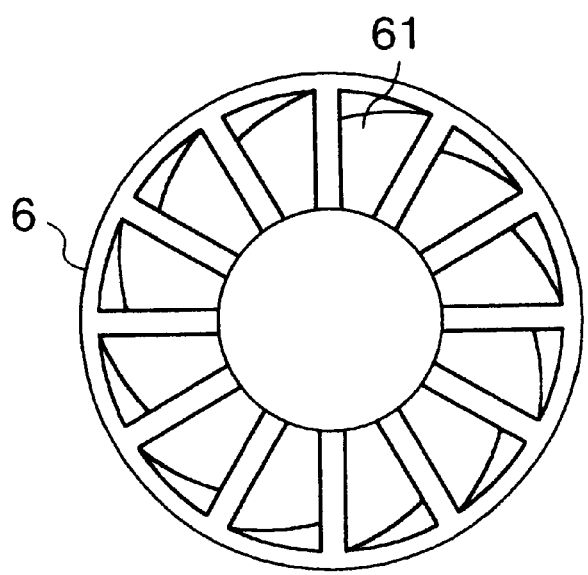
FIG. 4B is a front view of the gas blower of FIG. 3A.

The gas blower 5 may be replaced by a gas blower 6 as shown in FIGS. 3, 4A and 4B. The gas blower 6 has helical vanes and helical passages 61 (whose imaginary central faces extend obliquely relative to both the light beam axis 27 and the imaginary plane perpendicular to the light beam axis 27 or relative to both the imaginary plane perpendicular to the light beam axis 27 and the another imaginary plane including the light beam axis 27) between the helical vanes to form the circumferential flow component or helical flow of the gas into the electric discharge chamber 23. The passages 61 (or a combination arrangement of the passages 61) are tapered toward the electric discharge chamber 23 to decrease a cross sectional area of the passages 61 toward the electric discharge chamber 23, so that the gas flow blown into the electric discharge chamber 23 is accelerated.

Figure 5:
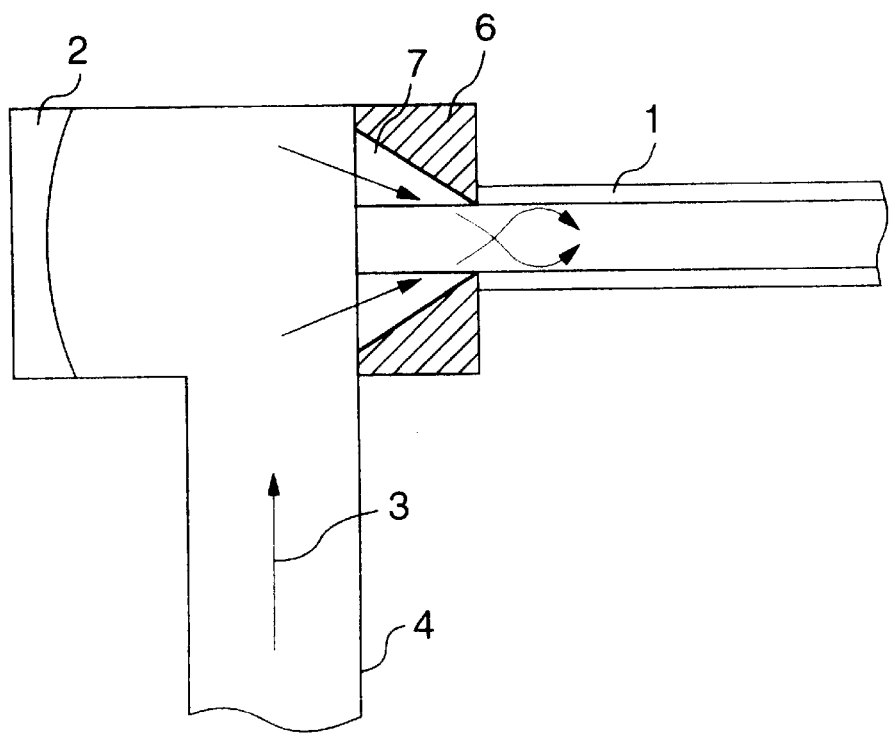
FIG. 5 is a cross-sectional side view of a gas blower including groove-passages of the present invention.
Figure 6A:
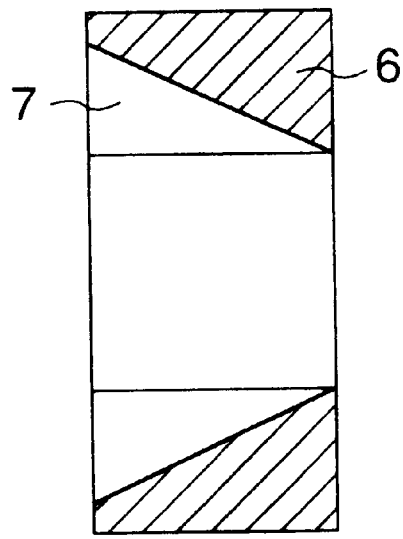
FIG. 6A is a cross-sectional side view of a gas blower taper grooved element with grooves tapered toward an electric discharge chamber (dielectric tube) in a gas flow direction, used in the gas blower of FIG. 5.
Figure 6B:
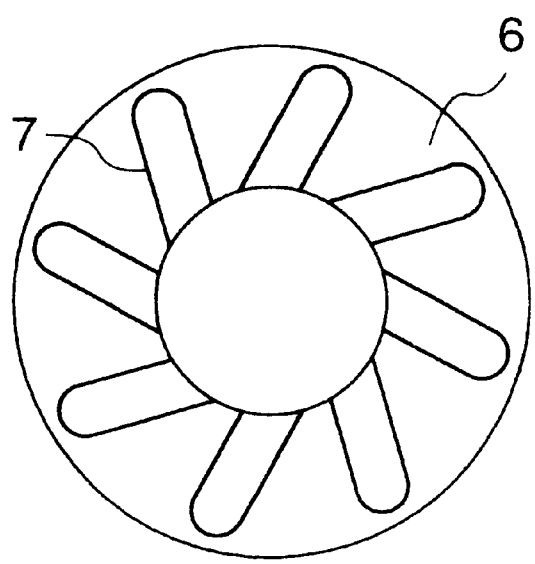
FIG. 6B is a front view of the gas blower taper grooved element of FIG. 6A, as seen from a left side of the element.

The gas blower 6 may have groove passages 7 as shown in FIGS. 5, 6A and 6B. Imaginary central faces of the groove passage 7 extend obliquely relative to both the light beam axis 27 and the imaginary plane perpendicular to the light beam axis 27 or relative to both the imaginary plane perpendicular to the light beam axis 27 and the another imaginary plane including the light beam axis 27 to form the circumferential flow component or helical flow of the gas into the electric discharge chamber 23. The passages 7 (or a combination arrangement of the passages 7) are tapered toward the electric discharge chamber 23 to decrease a cross sectional area of the passages 7 toward the electric discharge chamber 23, so that the gas flow blown into the electric discharge chamber 23 is accelerated.

Figure 7:
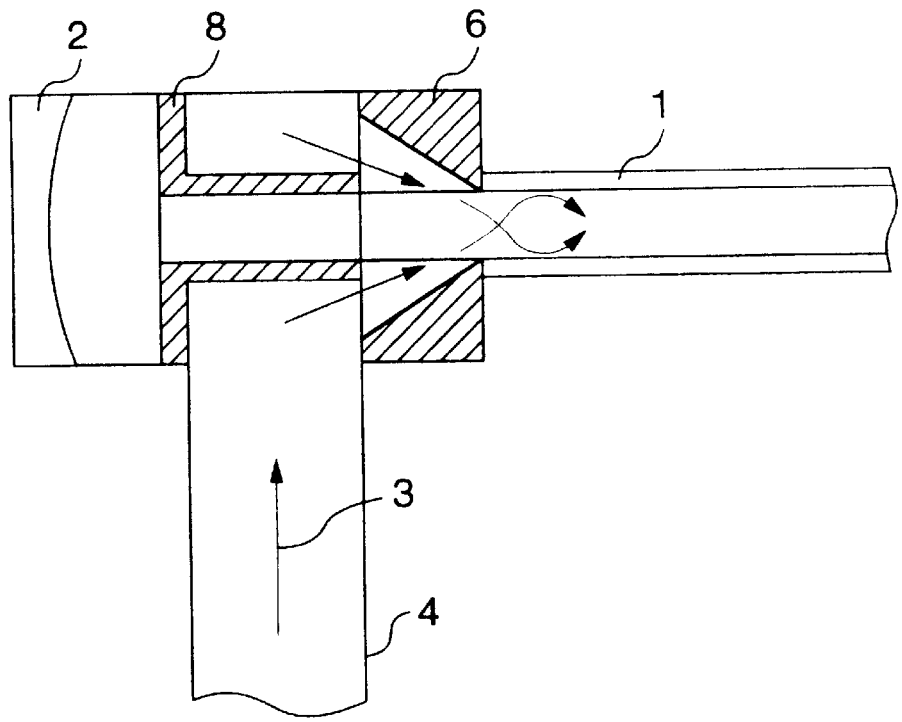
FIG. 7 is a cross-sectional side view of a gas blower of the present invention including a helical passage and a guide passage for guiding substantially all of the blown gas into the helical passage.

As shown in FIG. 7, the gas blower 6 may have a guide passage member 8 for guiding substantially all of the blown gas into the passages 61 or 7. A cylindrical guide passage or surface of the guide passage member 8 receives the whole of the gas supplied from the transfer pipe 4 and guides it to the passages 61 or 7.

Figure 8:
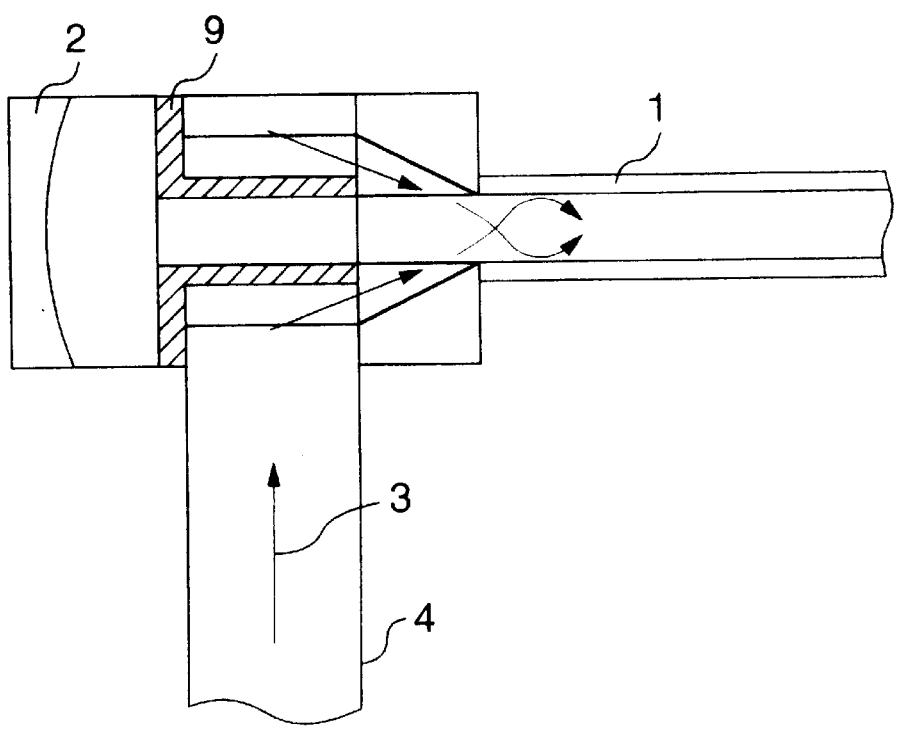
FIG. 8 is a cross-sectional side view of a gas blower of the present invention including a helical passage through which substantially all of the blown gas flows into the electric discharge chamber.
Figure 9A:
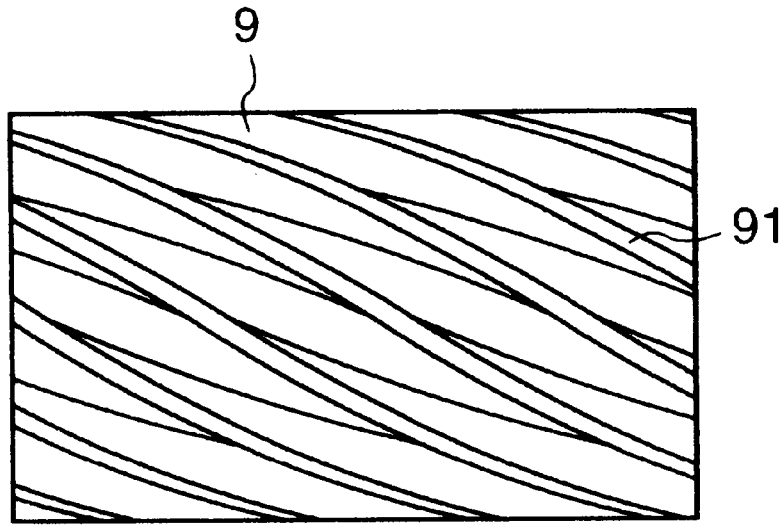
FIG. 9A is a side view of a gas blower with helical groove passages.
Figure 9B:
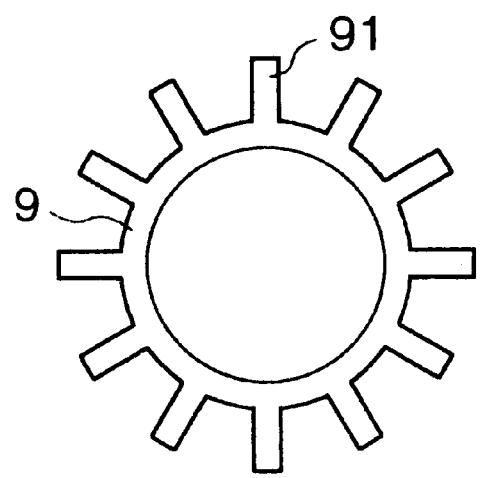
FIG. 9B is a front view of the gas blower of FIG. 9A.
Figure 10:
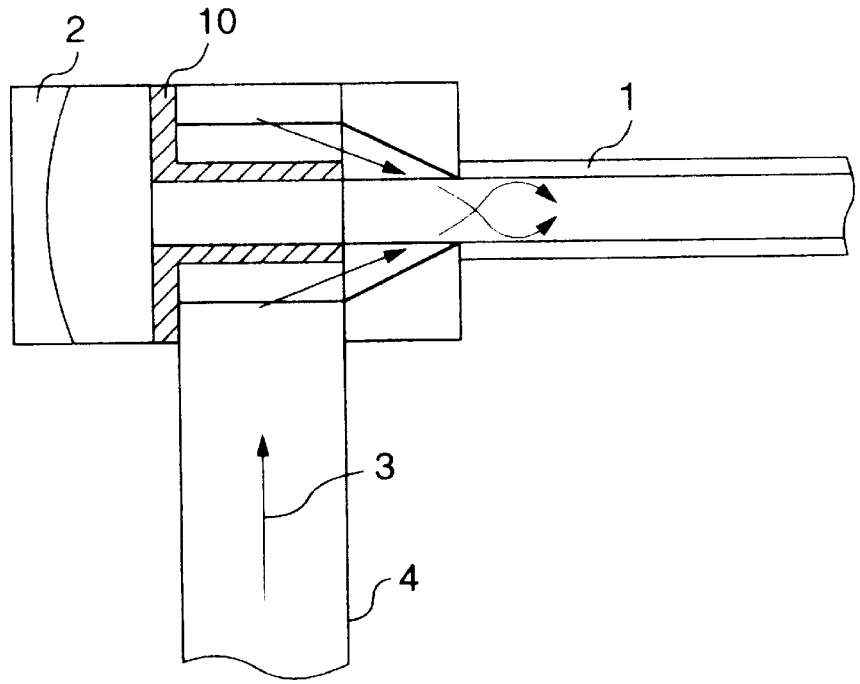
FIG. 10 is a cross-sectional side view of a gas blower of the present invention including a helical passage through which substantially all of the blown gas flows into the electric discharge chamber.

As shown in FIGS. 8 and 10, the gas blower 6 may have a guide helical passage member 9 or 10 for guiding substantially all of the blown gas into the passages 61 or 7. Helical guide passage or grooves 91 or 101 of the guide helical passage member 9 or 10 as shown 9A, 9B, 11A and 11B receive the whole of the gas supplied from the transfer pipe 4 and guide it to the passages 61 or 7.

Figure 12:
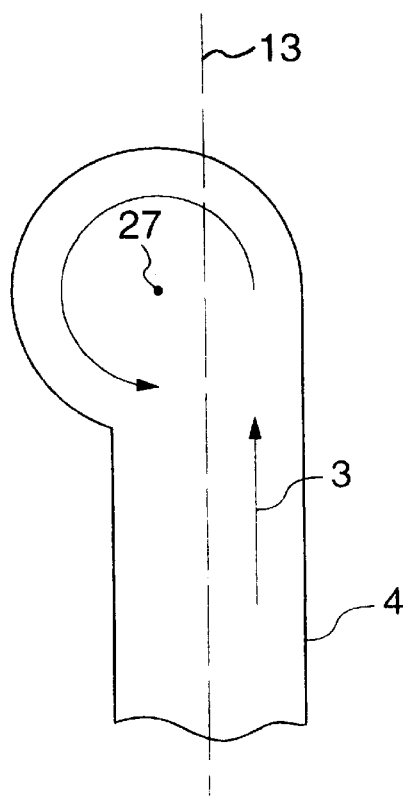
FIG. 12 is a schematic cross sectional view of a gas blower of the present invention taken along a plane perpendicular to the laser beam axis.
Figure 11A:
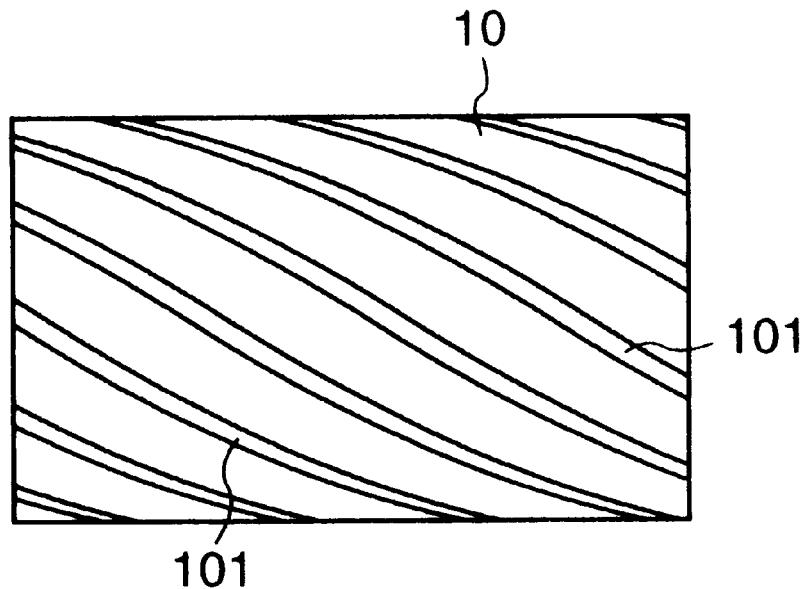
FIG. 11A is a side view of a gas blower with helical groove passages.
Figure 11B:
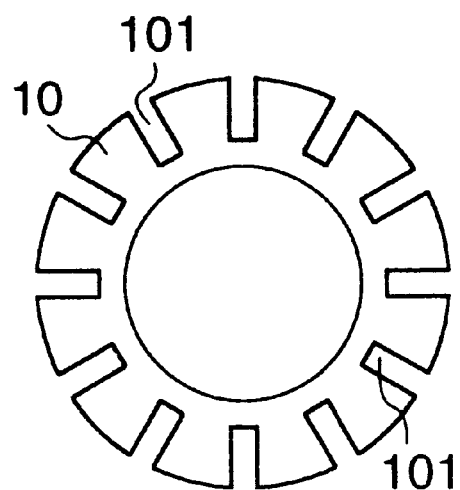
FIG. 11B is a front view of the gas blower of FIG. 10A.

As shown in FIG. 12, in the gas blower 5 or 6, gas passage axis 13 of the transfer pipe 4 as a component of the gas blower 5 or 6 is prevented from joining with the light beam axis 27 or is separated away from the light beam axis 27 in a radial direction of the dielectric tube 1 so that the circumferential flow component or helical flow of the gas is generated just before the gas proceeds into the dielectric tube 1.

What is claimed is:

1. A gas laser apparatus for generating a laser beam along a light beam axis, comprising, a gas as a laser medium, a dielectric tube through which the gas passes, and which surrounds the light beam axis, a pumping source generating an electric discharge through the gas existing in the dielectric tube to excite the gas so that a laser light is generated from the excited gas, and a gas blower blowing the gas into the dielectric tube, wherein the gas blower has at least one passage from which the gas is blown into the dielectric tube, and the passage extends helically.

2. A gas laser apparatus for generating a laser beam along a light beam axis, comprising, a gas as a laser medium, a dielectric tube through which the gas passes, and which surrounds the light beam axis, a pumping source generating an electric discharge through the gas existing in the dielectric tube to excite the gas so that a laser light is generated from the excited gas, and a gas blower blowing the gas into the dielectric tube, wherein the gas blower has a helical passage from which the gas is blown into the dielectric tube, and the whole of the gas to be blown into the dielectric tube passes through the helical passage.

3. A gas laser apparatus for generating a laser beam along a light beam axis, comprising, a gas as a laser medium, a dielectric tube through which the gas passes, and which surrounds the light beam axis, a pumping source generating an electric discharge through the gas existing in the dielectric tube to excite the gas so that a laser light is generated from the excited gas, and a gas blower blowing the gas into the dielectric tube, wherein the gas blower has at least one passage from which the gas is blown into the dielectric tube, and the passage extends obliquely relative to both the light beam axis and an imaginary plane perpendicular to the light beam axis.

4. A gas laser apparatus for generating a laser beam along a light beam axis, comprising, a gas as a laser medium, a dielectric tube through which the gas passes, and which surrounds the light beam axis, a pumping source generating an electric discharge through the gas existing in the dielectric tube to excite the gas so that a laser light is generated from the excited gas, and a gas blower blowing the gas into the dielectric tube, wherein the gas blower has at least one passage from which the gas is blown into the dielectric tube, and the passage extends obliquely relative to both an imaginary plane including the light beam axis and another imaginary plane perpendicular to the light beam axis.

5. A gas laser apparatus for generating a laser beam along a light beam axis, comprising, a gas as a laser medium, a dielectric tube through which the gas passes, and which surrounds the light beam axis, a pumping source generating an electric discharge through the gas existing in the dielectric tube to excite the gas so that a laser light is generated from the excited gas, and a gas blower blowing the gas into the dielectric tube, wherein the gas blower has a plurality of passages from which the gas is blown into the dielectric tube, the passages extend along respective passage axes, and the passage axes are prevented from joining with each other.

6. A gas laser apparatus for generating a laser beam along a light beam axis, comprising, a gas as a laser medium, a dielectric tube through which the gas passes, and which surrounds the light beam axis, a pumping source generating an electric discharge through the gas existing in the dielectric tube to excite the gas so that a laser light is generated from the excited gas, and a gas blower blowing the gas into the dielectric tube, wherein the gas blower has a tapered passage from which the gas is blown into the dielectric tube, and the tapered passage is substantially symmetrical relative to the laser beam axis.

7. A gas laser apparatus for generating a laser beam along a light beam axis, comprising, a gas as a laser medium, a dielectric tube through which the gas passes, and which surrounds the light beam axis, a pumping source generating an electric discharge through the gas existing in the dielectric tube to excite the gas so that a laser light is generated from the excited gas, and a gas blower blowing the gas into the dielectric tube, wherein the gas blower has at least one passage from which the gas is blown into the dielectric tube, and a cross sectional gas-flow area of the passage decreases toward the dielectric tube.

8. A gas laser apparatus for generating a laser beam along a light beam axis, comprising, a gas as a laser medium, a dielectric tube through which the gas passes, and which surrounds the light beam axis, a pumping source generating an electric discharge through the gas existing in the dielectric tube to excite the gas so that a laser light is generated from the excited gas, and a gas blower blowing the gas into the dielectric tube, wherein the gas blower has a plurality of passages from which the gas is blown into the dielectric tube, and the passages extend substantially parallel to each other.

9. A gas laser apparatus for generating a laser beam along a light beam axis, comprising, a gas as a laser medium, a dielectric tube through which the gas passes, and which surrounds the light beam axis, a pumping source generating an electric discharge through the gas existing in the dielectric tube to excite the gas so that a laser light is generated from the excited gas, and a gas blower blowing the gas into the dielectric tube, wherein the gas blower has at least one passage from which the gas is blown into the dielectric tube, and the passage extends obliquely relative to both an imaginary plane including the light beam axis and another imaginary plane perpendicular to the light beam axis.

* * * * *